Patented Jan. 9, 1940

2,186,454

UNITED STATES PATENT OFFICE 2,186,454

LACQUERS CONTAINING CELLULOSE ACETOBUTYRATE AND CELLULOSE ACETOPROPIONATE

Walter E. Gloor, South River, N. J., assignor to Hercules Powder Company, Wilmington, Del., a corporation of Delaware No Drawing. Application June 24, 1937, Serial No. 150,214

12 Claims. (Cl. 91—68)

This invention relates to lacquers containing cellulose acetobutyrate and cellulose acetopropionate.

Hitherto lacquers have generally been produced with nitrocellulose as a base. However, such lacquers have suffered from various disadvantages among which may be mentioned inflammability and discoloration on exposure to heat or light. It has accordingly been proposed to use certain organic esters of cellulose, principally cellulose acetate, as a base for lacquers. Cellulose acetate, however, is not very suitable for use in lacquers because of its incompatibility with most natural and especially with most synthetic resins, necessary ingredients of a lacquer satisfactory for general use. Thus, for example, cellulose acetate is incompatible with various polybasic acid-polyhydric alcohol resins, phenol-formaldehyde resins, vinyl acetate resins, etc., all of which are valuable types of lacquer resins, in the proportions necessary for the formulation of a satisfactory lacquer. The higher fatty acid esters of cellulose such as cellulose butyrate, cellulose propionate, etc., are compatible with synthetic resins but the utility of these compositions is limited because of the softness and tackiness of the resultant films as well as the instability of the esters.

Now in accordance with this invention, it has been found that cellulose acetobutyrate and cellulose acetopropionate, mixed esters of cellulose, containing, on the basis of 3 hydroxyl groups present in cellulose, from 0.3 to 2 of these hydroxyl groups replaced by higher fatty acid radicles, that is butyryl or propionyl radicles, the remainder being replaced substantially completely by the acetyl radicle, are compatible to a marked degree with various of the synthetic resins commonly used in nitrocellulose lacquers and the films so produced are hard and non-tacky, although, as has been said, cellulose acetate is incompatible with these resins, and the higher fatty acid esters of cellulose, such as cellulose butyrate, cellulose propionate though compatible, suffer from the drawbacks above mentioned. The term "synthetic resin" has heretofore been used somewhat loosely in the coating composition art, and it is felt advisable to define its meaning as used in this specification. The term "synthetic resin" is here used in its strict sense and refers to those resinous materials produced by synthesis from non-resinous materials or to resins derived therefrom, in contrast to natural resins and those artificial resins which owe their resinous characteristics to the use of natural resins in their production.

Not all synthetic resins are compatible with cellulose acetobutyrate and cellulose acetopropionate, since, of course, there are synthetic resins which are intended for use in molded articles and are insoluble and infusible, and there are others intended for use in varnishes and not suited for use in any type of lacquer. Most all of the synthetic resins utilizable in nitrocellulose lacquers, however, will be found to be compatible with cellulose acetobutyrate and cellulose acetopropionate. The term "compatible" is defined as indicating that a lacquer containing over 3%, referred to the solids content, of resin is clear. As examples of synthetic resins which are compatible with cellulose acetobutyrate and cellulose acetopropionate, the following may be mentioned by way of illustration:

1. Soluble polybasic acid-polyhydric alcohol resins either saturated or having a relatively low iodine value, as, for example, glycol phthalate, a mixed glycol-glyceryl phthalate, a glyceryl phthalate-glycol succinate resin, a glyceryl phthalate modified with a saturated dibasic acid, or with a saturated fatty acid, a glyceryl phthalate modified with a non-drying oil or with an unsaturated acid derived from a non-drying oil, etc.; the phthalic anhydride constituent of these resins being, of course, replaceable by any desired organic dicarboxylic acid.

2. Resins similar to those described above produced with a terpene-maleic anhydride product, as terpinene-terpinolene-pinene- or dipentene-maleic anhydride, etc.; instead of phthalic anhydride.

3. Soluble polymerized vinyl acetate or ethyl acrylate resins, polyvinyl acetate, acetals and methylals, etc.

The lacquers in accordance with this invention will accordingly comprise cellulose acetobutyrate or cellulose acetopropionate, a compatible synthetic resin, and a solvent. Usually a plasticizer as for example, dibutyl phthalate, triethyl citrate, tricresyl phosphate, etc., will be included, but the use of a plasticizer is not essential and may, in accordance with this invention, be omitted. Pigments, etc., may be added if desired. Any solvent, or mixture, of solvents, having a solvent action on the ingredients, as, for example, acetone, ethylene dichloride, toluol, methyl Cellosolve acetate, ethyl acetate, etc., may be used. The proportions of the various ingredients may be widely varied, depending upon the particular use for which the lacquer is intended, but in order to produce a homogeneous, hard, adhesive film from the lacquer the total amount of resin and plasticizer should not exceed about 75% of the solids in the lacquer, and the quantity of plasticizer should not exceed the amount of resin present.

The formulae given below are illustrative of the practical embodiment of this invention and represent compositions having spraying viscosities.

|  | A | B | C | D |
|---|---|---|---|---|
| Cellulose acetobutyrate | 10 | 10 | 10 | 10 |
| Glycerol-phthalic anhydride-non-drying oil resin | 5 | 10 | 5 | 7 |
| Dibutylphthalate | 2 | 4 | 5 | --- |
| Solvent | 83 | 76 | 80 | 83 |
| Hardness of film on Pfund hardness meter, 0.002" film thickness | 220 | 30 | 30 | 200 |
| Solvent formula: |  |  |  |  |
| Acetone | 25 |  |  |  |
| Ethyl acetate | 24 |  |  |  |
| Acetic ester of ethylene glycol monomethyl ether | 17 |  |  |  |
| Toluol | 34 |  |  |  |

These formulae typify a clear, hard lacquer which is unusually resistant to wear. All lasted over fifteen months on outdoor exposure tests.

The following formulae illustrate pigmented lacquers which are exceptionally free from "chalking" in comparison with other lacquers embodying the same pigment.

|  | E | F |
|---|---|---|
| Cellulose acetobutyrate | 8.0 | 8.0 |
| Dibutylphthalate | 4.8 | 4.8 |
| Glycerol-phthalic anhydride-non-drying oil resin | 8.0 | 8.0 |
| $TiO_2$ pigment | 4.0 | 8.0 |
| Acetone | 18.7 | 18.7 |
| Ethyl lactate | 5.0 | 5.0 |
| Ethylene dichloride | 15.0 | 15.0 |
| Methyl Cellosolve acetate | 15.0 | 15.0 |
| Toluol | 21.5 | 17.5 |

Formula E showed only 0.2 mg. and Formula F, 1.4 mg. chalking after 360 hours exposure in comparison to usual values in other lacquers for the same amount of titanium dioxide of from 1.5 to 5.0 mg. in 220 hours.

The following compositions are similar in nature to those illustrated in Examples A to D:

|  | G | H |
|---|---|---|
| Cellulose acetobutyrate | 8 | 3 |
| Glycerol phthalate-glycol succinate resin | 6 | --- |
| Glycerol phthalate-oleate resin | --- | 3 |
| Dibutyl phthalate | --- | 3 |
| Solvent as in Examples A–D | 86 | 86 |

The following formulae are illustrative of lacquers containing synthetic resins made from terpinene-maleic anhydride instead of phthalic anhydride.

|  | I | J | K | L | M |
|---|---|---|---|---|---|
| Cellulose acetobutyrate | 6 | 6 | 6 | 6 | 6 |
| Terpinene-maleic anhydride esterified with glycol | 3 | --- | --- | 6 | 12 |
| Terpene-maleic anhydride esterified with glycerol and modified with succinic acid | --- | 3 | --- | --- | --- |
| Terpinene-maleic anhydride esterified with glycerol and modified with oleic acid | --- | --- | 3 | 1 | 2 |
| Dibutyl phthalate | 32 | 32 | 30 | 30 | 26 |
| Acetone | 25 | 25 | 25 | 25 | 20 |
| Toluol | 10 | 10 | 10 | 10 | 10 |
| Methyl Cellosolve acetate | 24 | 24 | 24 | 24 | 24 |
| Ethylene dichloride |  |  |  |  |  |

These lacquers are suitable for use as protective coatings on metal and are unusually weather resistant and color-fast.

The compositions illustrated below are typical of lacquers containing a soluble polymerized vinyl acetate type synthetic resin. The compatibility of cellulose acetobutyrate with this class of resin permits the formulation of a wide variety of coating compositions, depending whether hard or soft grades of resin are used. Water-white coatings of great resistance to ultra-violet light are obtained through the use of these resins.

|  | O | R | S |
|---|---|---|---|
| Cellulose acetobutyrate | 6 | 6 | 6 |
| Poly-vinyl acetate resin M. P. 85° C | 7.5 | --- | --- |
| Poly-vinyl acetate resin M. P. 150° C | --- | 6 | 6 |
| Dibutyl phthalate | --- | --- | 1.5 |
| Acetone | 25 | 25 | 25 |
| Ethyl acetate | 25 | 25 | 25 |
| Ethyl lactate | 10 | 10 | 10 |
| Methyl Cellosolve acetate | 10 | 10 | 10 |
| Toluol | 16.5 | 18 | 16.5 |
| Pfund hardness | 56 | --- | 61 |

Such lacquers are particularly adapted for use as clear metal lacquers on such things as light fixtures, etc.

The prior art has attempted for years to apply a clear coat of lacquer containing cellulose acetate, mixed esters or other clear finishes over pigmented nitrocellulose finishes, especially those containing a white pigment, for the purpose of protecting the pigmented finish from the destructive effects of ultra-violet light. Heretofore however, all of these finishes have failed in 5 to 10 months because of the disintegration of the nitrocellulose at the interface causing the clear top coat to peel off or they failed quite rapidly by the checking of the entire system.

After long experimenting I have found that a surface coated with a pigmented lacquer containing cellulose acetobutyrate or cellulose acetopropionate, an aromatic polybasic acid-polyhydric alcohol resin modified with a non-drying oil, or a soluble polymerized vinyl acetate resin, a plasticizer and a solvent and then superimposing a clear top coat of substantially the same composition produces a coating system that stays glossy for more than 15 months' accelerated weathering, shows no failures, substantially no chalking and may be freed of soot, dirt, etc. from time to time by simply wiping off these materials.

The examples below further illustrate the practical embodiment of this invention Parts by weight Cellulose acetobutyrate {35% acetyl, 18% butyryl} ------ 12

Non-drying oil modified polybasic acid-polyhydric alcohol resin (50% solution in solvent composed of 1 part toluene by weight and 1 part butyl acetate by weight) 10.6

Dibutyl phthalate ------ 0.2

Titanium dioxide paste {50 parts by wt. $TiO_2$, 25 parts by wt. dibutyl phthalate, 15 parts by wt. xylol, 10 parts by wt. butanol} 10.0

Solvent* ------ 117.2

Parts by weight

*Solvent
Ethyl acetate ------ 15
Ethylene dichloride ------ 15
Acetone ------ 30
Methyl cellosolve acetate ------ 20
Toluol ------ 20

Two coats of this may, for example, be sprayed on a suitably primed metal surface and then given a clear top coating of a lacquer based on the formula below:

| | Parts by weight |
|---|---|
| Cellulose acetobutyrate | 12 |
| Resin solution (as above) | 10.6 |
| Dibutyl phthalate | 2.7 |
| Solvent (as above) | 124.7 |

Alternatively I may use the following procedure:

| | Parts by weight |
|---|---|
| Cellulose acetopropionate {25% propionyl, 18% acetyl} | 12 |
| Resin solution (as above) | 10.6 |
| Dibutyl phthalate | 0.2 |
| Titanium dioxide paste (as above) | 10.0 |
| Solvent** | 117.2 |

| **Solvent | Parts by weight |
|---|---|
| Butyl acetate | 20 |
| Ethyl acetate | 20 |
| Denatured alcohol | 10 |
| Butyl alcohol | 10 |
| Toluol | 40 |

The procedure followed is the same as before, the clear top coat formula used being the same except that cellulose acetopropionate is used in place of the cellulose acetobutyrate and the solvent is that shown in the present example.

The use of a resin such as damar or ester gum in place of the synthetic resin in formulae such as those shown to give a non-chalking finish, produces a lacquer without the high resistance to chalking or cracking observed with these materials. Furthermore, polybasic acid-polyhydric alcohol resins without modification of non-drying oils or acids when incorporated with these esters and used in the same system of coating give less durable coatings than those described, for example, in the last two examples above.

It will be understood that the details and formulae hereinabove set forth are illustrative only, and othat the invention as herein broaodly described and claimed is in no way limited thereby.

This is a continuation-in-part of my co-pending application Serial No. 753,304 filed on November 16, 1934, now United States Patent No. 2,111,446.

What I claim and desire to protect by Letters Patent is:

1. A surface having imposed thereon a basic protective pigmented coating comprising a cellulose mixed organic acid derivative from the group consisting of cellulose acetobutyrate and cellulose acetopropionate, a synthetic resin selected from the group consisting of aromatic polybasic acid-polyhydric alcohol resins modified with a non-drying oil and soluble polymerized vinyl acetate resins, a plasticizer and a solvent and superimposed thereon a clear top coat, containing no pigment, of substantially the same composition, such coated surface being characterized by high weather resistance and substantially permanent retention of gloss.

2. A surface having imposed thereon a basic protective pigmented coating comprising cellulose acetobutyrate, a synthetic resin selected from the group consisting of aromatic polybasic acid-polyhydric alcohol resins modified with a non-drying oil and soluble polymerized vinyl acetate resins, a plasticizer and a solvent and superimposed thereon a clear top coat, containing no pigment, of substantially the same composition, such coated surface being characterized by high weather resistance and substantially permanent retention of gloss.

3. A surface having imposed thereon a basic protective pigmented coating comprising cellulose acetopropionate, a synthetic resin selected from the group consisting of aromatic polybasic acid-polyhydric alcohol resins modified with a non-drying oil and soluble polymerized vinyl acetate resins, a plasticizer and a solvent and superimposed thereon a clear top coat, containing no pigment, of substantially the same composition, such coated surface being characterized by high weather resistance and substantially permanent retention of gloss.

4. A surface having imposed thereon a basic protective pigmented coating comprising cellulose aceto-butyrate, an aromatic polybasic acid-polyhydric alcohol resin modified with a non-drying oil, a plasticizer and a solvent and superimposed thereon a clear top coat, containing no pigment, of substantially the same composition, such coated surface being characterized by high weather resistance and substantially permanent retention of gloss.

5. A surface having imposed thereon a basic protective pigmented coating comprising cellulose aceto-propionate, an aromatic polybasic acid-polyhydric alcohol resin modified with a non-drying oil, a plasticizer and a solvent and superimposed thereon a clear top coat, containing no pigment, of substantially the same composition, such coated surface being characterized by high weather resistance and substantially permanent retention of gloss.

6. A surface having imposed thereon a basic protective pigmented coating comprising cellulose acetopropionate, a soluble polymerized vinyl acetate resin, a plasticizer and a solvent and superimposed thereon a clear top coat, containing no pigment, of substantially the same composition, such coated surface being characterized by high weather resistance and substantially permanent retention of gloss.

7. The method of protecting a surface which comprises applying thereto a basic protective pigmented coating comprising a mixed cellulose organic acid derivative from the group consisting of cellulose acetobutyrate and cellulose acetopropionate, a synthetic resin selected from the group consisting of aromatic polybasic acid-polyhydric alcohol resins modified with a non-drying oil and soluble polymerized vinyl acetate resins, a plasticizer and a solvent and superimposing thereon a clear top coat, containing no pigment of substantially the same composition.

8. The method of protecting a surface which comprises applying thereto a basic protective pigmented coating comprising cellulose acetobutyrate, a synthetic resin selected from the group consisting of aromatic polybasic acid-polyhydric alcohol resins modified with non-drying oils and soluble polymerized vinyl acetate resins, a plasticizer and a solvent and superimposing thereon a clear top coat, containing no pigment, of substantially the same composition.

9. The method of protecting a surface which comprises applying thereto a basic protective pigmented coating comprising cellulose acetopropionate, a synthetic resin selected from the group consisting of aromatic polybasic acid-polyhydric alcohol resins modified with non-drying oils and soluble polymerized vinyl acetate resins, a plasticizer and a solvent and superimposing thereon a clear top coat, containing no pigment, of substantially the same composition.

10. The method of protecting a surface which comprises applying thereto a basic protective pigmented coating comprising cellulose acetobutyrate, an aromatic polybasic acid-polyhydric alcohol resin modified with a non-drying oil, a plasticizer and a solvent and superimposing thereon a clear top coat, containing no pigment, of substantially the same composition.

11. The method of protecting a surface which comprises applying thereto a basic protective pigmented coating comprising cellulose acetopropionate, an aromatic polybasic acid-polyhydric alcohol resin modified with a non-drying oil, a plasticizer and a solvent and superimposing thereon a clear top coat, containing no pigment, of substantially the same composition.

12. The method of protecting a surface which comprises applying thereto a basic protective pigmented coating comprising cellulose acetopropionate, a soluble polymerized vinyl acetate resin, a plasticizer and a solvent and superimposing thereon a clear top coat, containing no pigment, of substantially the same composition.

WALTER E. GLOOR.